(12) United States Patent
Nomura et al.

(10) Patent No.: US 9,997,753 B2
(45) Date of Patent: Jun. 12, 2018

(54) MOUNTING STRUCTURE FOR ELECTRIC STORAGE APPARATUS

(75) Inventors: Bunji Nomura, Toyota (JP); Kouichi Daigaku, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 330 days.

(21) Appl. No.: 14/350,867

(22) PCT Filed: Oct. 11, 2011

(86) PCT No.: PCT/JP2011/005690
§ 371 (c)(1),
(2), (4) Date: Apr. 10, 2014

(87) PCT Pub. No.: WO2013/054373
PCT Pub. Date: Apr. 18, 2013

(65) Prior Publication Data
US 2014/0242447 A1  Aug. 28, 2014

(51) Int. Cl.
*H01M 2/10* (2006.01)
*B60K 1/04* (2006.01)
(Continued)

(52) U.S. Cl.
CPC ............. *H01M 2/1083* (2013.01); *B60K 1/04* (2013.01); *B60L 3/0007* (2013.01); *B60L 3/0046* (2013.01); *B60L 3/0069* (2013.01); *B60L 3/04* (2013.01); *B60L 11/005* (2013.01); *B60L 11/1803* (2013.01); *B60L 11/1864* (2013.01); *B60L 11/1877* (2013.01); *B60L 11/1879* (2013.01); *B60K 2001/0416* (2013.01); *B60K 2001/0438* (2013.01);
(Continued)

(58) Field of Classification Search
CPC .............. H01M 2/1083; H01M 2/1016; B60L 11/1879; B60L 11/1877
See application file for complete search history.

(56) References Cited

U.S. PATENT DOCUMENTS 1,173,616 A * 2/1916 Stone ...................... B60R 16/04
                                                       180/68.5
4,317,497 A * 3/1982 Alt ....................... H01M 2/1083
                                                       180/68.5
(Continued)

FOREIGN PATENT DOCUMENTS

CN         1572559 A      2/2005
CN       101263020 A      9/2008
(Continued)

*Primary Examiner* — Maria Laios
(74) *Attorney, Agent, or Firm* — Hunton Andrews Kurth LLP

(57) ABSTRACT

A mounting structure for an electric storage apparatus includes the electric storage apparatus, a vehicle body, a first reinforce, and a second reinforce. The electric storage apparatus outputs an energy for use in running of a vehicle. The vehicle body includes a concave portion opened upward in the vehicle. The concave portion houses the electric storage apparatus. The first reinforce is disposed along a bottom face of the concave portion and extends in a predetermined direction. The second reinforce is disposed along an upper face of the electric storage apparatus and extends in the predetermined direction.

10 Claims, 5 Drawing Sheets

(51) Int. Cl.
  *B60L 11/00* (2006.01)
  *B60L 11/18* (2006.01)
  *B60L 3/00* (2006.01)
  *B60L 3/04* (2006.01)

(52) U.S. Cl.
  CPC ... *B60K 2001/0466* (2013.01); *B60L 2210/10* (2013.01); *B60L 2240/545* (2013.01); *B60L 2240/547* (2013.01); *B60L 2240/549* (2013.01); *B60Y 2306/01* (2013.01); *Y02T 10/7005* (2013.01); *Y02T 10/7022* (2013.01); *Y02T 10/7061* (2013.01); *Y02T 10/7216* (2013.01)

(56) References Cited

U.S. PATENT DOCUMENTS

| | | |
|---|---|---|
| 2004/0079569 A1 | 4/2004 | Awakawa |
| 2004/0235315 A1 | 11/2004 | Masui et al. |
| 2008/0258506 A1 | 10/2008 | Egawa et al. |
| 2008/0283317 A1 * | 11/2008 | Wagner .................. B60R 16/04 180/68.5 |
| 2009/0120703 A1 | 5/2009 | Nagata |
| 2010/0170735 A1 | 7/2010 | Nakamura et al. |
| 2010/0289295 A1 * | 11/2010 | Yoda ........................ B60K 1/04 296/187.03 |
| 2011/0011654 A1 | 1/2011 | Kubota et al. |

FOREIGN PATENT DOCUMENTS

| | | | | |
|---|---|---|---|---|
| CN | 101909914 A | | 12/2010 | |
| EP | 2065241 A1 | | 6/2009 | |
| EP | 2241467 A1 | | 10/2010 | |
| JP | 05-201356 A | * | 8/1993 | ............ B62D 25/20 |
| JP | 05-201356 A | | 10/1993 | |
| JP | 2000-238541 A | | 9/2000 | |
| JP | 2000-351329 A | | 12/2000 | |
| JP | 2004-148852 A | | 5/2004 | |
| JP | 2004-243885 A | | 9/2004 | |
| JP | 2004-345454 A | | 12/2004 | |
| JP | 2004-352029 A | | 12/2004 | |
| JP | 2007-161075 | * | 6/2007 | ............ B62D 25/20 |
| JP | 2007-161075 A | | 6/2007 | |
| JP | 2007-331719 A | | 12/2007 | |
| JP | 2008-074159 A | | 4/2008 | |
| JP | 2008-247371 A | | 10/2008 | |
| JP | 2008-265540 A | | 11/2008 | |
| JP | 2010-013055 A | | 1/2010 | |
| WO | 2004/071798 A1 | | 8/2004 | |
| WO | 2009/098952 A1 | | 8/2009 | |
| WO | WO-2009139229 A1 | * | 11/2009 | ............... B60K 1/04 |

* cited by examiner

MOUNTING STRUCTURE FOR ELECTRIC STORAGE APPARATUS

CROSS-REFERENCE TO RELATED APPLICATIONS

This is a national phase application based on the PCT International Patent Application No. PCT/JP2011/005690 filed on Oct. 11, 2011, the entire contents of which are incorporated herein by reference.

TECHNICAL FIELD

The present invention relates to a structure for mounting an electric storage apparatus on a vehicle.

BACKGROUND ART

Patent Documents 1 to 3 have described vehicles in which a battery pack or an electric double layer capacitor is fixed to a vehicle body. In the vehicle described in Patent Document 1, a concave portion is formed in a floor of the vehicle body and the battery pack is housed into the concave portion.

PRIOR ART DOCUMENTS

Patent Documents

[Patent Document 1] Japanese Patent Laid-Open No. 2004-345454
[Patent Document 2] Japanese Patent Laid-Open No. 2004-243885
[Patent Document 3] Japanese Patent Laid-Open No. 2000-351329

DISCLOSURE OF THE INVENTION

Problems to be Solved by the Invention

When the battery pack is housed in the concave portion formed in the floor of the vehicle body as in the structure described in Patent Document 1, it is necessary to ensure the strength of the concave portion. If the concave portion is easily deformable, the battery pack housed in the concave portion may be given a shock.

Means for Solving the Problems

According to an aspect, the present invention provides a mounting structure for an electric storage apparatus including the electric storage apparatus, a vehicle body, a first reinforce, and a second reinforce. The electric storage apparatus outputs an energy for use in running of a vehicle. The vehicle body includes a concave portion opened upward in the vehicle. The concave portion houses the electric storage apparatus. The first reinforce is disposed along a bottom face of the concave portion and extends in a predetermined direction. The second reinforce is disposed along an upper face of the electric storage apparatus and extends in the predetermined direction.

According to the present invention, the first reinforce and the second reinforce extending in the predetermined direction can be used to increase the strength of the concave portion. Since the first reinforce is disposed along the bottom face of the concave portion and the second reinforce is disposed along the upper face of the electric storage apparatus, that is, along an upper portion of the concave portion, the strength of the entire concave portion can be increased. The strength of the concave portion can be ensured to protect the electric storage apparatus housed in the concave portion.

The first reinforce may be formed independently of the concave portion or may be formed integrally with the concave portion. When the first reinforce and the concave portion are formed integrally, the number of parts can be reduced. An end portion of the second reinforce in the predetermined direction can be disposed at a position adjacent to a cross-member which is a portion of the vehicle body and extends in a left-right direction of the vehicle. When an external force in the predetermined direction acts on the second reinforce, the end portion of the second reinforce can be abutted on the cross-member to direct the external force acting on the second reinforce to the cross-member.

In a configuration in which a fastening member is used to fasten the electric storage apparatus to the bottom face of the concave portion, a guide member can be used to guide the electric storage apparatus to a mounting position in the concave portion. The mounting position refers to the position where the electric storage apparatus can be fastened to the concave portion by the fastening member. In fastening the electric storage apparatus to the bottom face of the concave portion, the electric storage apparatus obstructs an operator's view to cause the operator to have difficulty in mounting the electric storage apparatus at the mounting position. To address this, the guide member can be used to place the electric storage apparatus easily at the mounting position.

The guide member can be disposed at each of positions between which the electric storage apparatus is sandwiched in the predetermined direction. This can perform the positioning of the electric storage apparatus in the predetermined direction. When such a plurality of guide members are used, a first guide member can be disposed along the bottom face of the concave portion, and a second guide member can be disposed along the upper portion of the concave portion.

The electric storage apparatus can have a third reinforce disposed along the upper face or a lower face of the electric storage apparatus. The third reinforce can be used to increase the strength of the electric storage apparatus. When the electric storage apparatus includes a plurality of electric storage elements, the plurality of electric storage elements can be disposed along the direction in which the third reinforce extends.

The third reinforce can be disposed to extend in the direction intersecting the first reinforce or the second reinforce. The third reinforce can be fixed to the first reinforce or the second reinforce at the portion intersecting the first reinforce or the second reinforce. The third reinforce can be fixed to the first reinforce or the second reinforce to ensure the strength of the electric storage apparatus also in the direction in which the first reinforce or the second reinforce extends.

The concave portion can be located below a luggage space of the vehicle. The first reinforce and the second reinforce can be disposed to extend in a front-rear direction of the vehicle. When the concave portion is disposed below the luggage space, the concave portion is likely to be given a shock from the back of the vehicle. With the first reinforce and the second reinforce extending in the front-rear direction of the vehicle, the first reinforce and the second reinforce can receive the shock if it is given to the concave portion from the back of the vehicle, thereby suppressing the deformation of the concave portion.

MODE FOR CARRYING OUT THE INVENTION

Embodiments of the present invention will hereinafter be described.

Embodiment 1

Description is now made of a mounting structure for a battery pack (electric storage apparatus) which is Embodiment 1 of the present invention. The battery pack of the present embodiment is mounted on a vehicle. Examples of the vehicle include a hybrid vehicle and an electric vehicle. The hybrid vehicle has not only the battery pack but also a fuel cell or an engine as the power source for running the vehicle. The electric vehicle has only the battery pack as the power source for running the vehicle.

Figure 1:
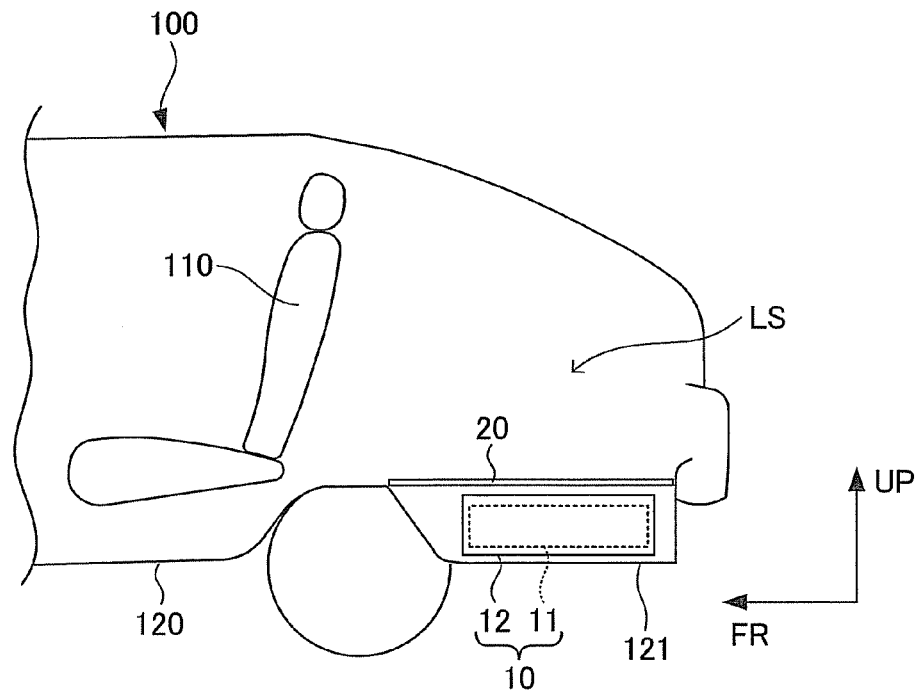
FIG. 1 is a schematic diagram showing the structure of part of a vehicle.

FIG. 1 is a schematic diagram showing the structure of part of the vehicle. In FIG. 1, an arrow FR indicates a direction in which the vehicle moves forward, and an arrow UP indicates an upward direction of the vehicle. The arrow FR and the arrow UP indicate those directions in the other figures.

A seat 110 is disposed in the vehicle interior. The vehicle interior refers to the space where an occupant rides. The seat 110 is fixed to a floor panel 120 of a vehicle 100. The floor panel 120 is a portion of a vehicle body. A luggage space LS is provided at the back of the seat 110 in the vehicle 100. The luggage space LS is a space mainly for putting luggage. Although the luggage space LS communicates with the vehicle interior in the vehicle 100 of the present embodiment, the present invention is not limited thereto. Specifically, the luggage space LS and the vehicle interior may be separated by a member mounted on the vehicle 100.

The floor panel 120 has a concave portion 121 at the position associated with the luggage space LS. The concave portion 121 is positioned below the luggage space LS and opened upward in the vehicle 100. In a conventional vehicle, the concave portion 121 may be used for housing a spare tire. In the vehicle 100 of the present embodiment, a battery pack 10 is housed in the concave portion 121. The battery pack 10 does not protrude from the concave portion 121 toward the luggage space LS.

An upper face of the battery pack 10 is covered with a deck board 20. The deck board 20 is formed in a flat plate shape and used for defining the luggage space LS. The space of the vehicle 100 that is located above the deck board 20 serves as the luggage space LS.

The battery pack 10 has an assembled battery 11 and a case 12 for housing the assembled battery 11. The assembled battery 11 has a plurality of cells connected electrically in series. A secondary battery such as a nickel metal hydride battery or a lithium-ion battery can be used as the cell. An electric double layer capacitor may be used instead of the secondary battery.

The cell may have any shape. For example, a so-called cylindrical-type or square-type cell can be used as the cell. The cylindrical-type cell has an outer shape conforming to a cylinder. The square-type cell has an outer shape conforming to a rectangular parallelepiped.

An electric energy output from the assembled battery 11 is used for running the vehicle 100. Specifically, the electric power output from the assembled battery 11 is supplied to a motor generator. The motor generator receives the electric power output from the assembled battery 11 to produce a kinetic energy for use in running of the vehicle. The motor generator is coupled to wheels, and the kinetic energy produced by the motor generator is transferred to the wheels.

For decelerating or stopping the vehicle 100, the motor generator converts a kinetic energy generated in braking of the vehicle 100 into an electric energy. The electric power produced by the motor generator can be supplied to the assembled battery 11 to charge the assembled battery 11. A DC/DC converter and an inverter can be placed on a current path connecting the assembled battery 11 with the motor generator. The DC/DC converter can be used to increase the voltage output from the assembled battery 11 to supply the increased voltage to the motor generator. The inverter can be used to allow an AC motor to be used as the motor generator.

The assembled battery 11 may include a plurality of cells connected electrically in parallel. The number of the cells constituting the assembled battery 11 can be set as appropriate in view of the output or the like required of the assembled battery 11. The case 12 can be made of metal, for example. The assembled battery 11 is fixed to an inner wall face of the case 12. For example, the assembled battery 11 can be fixed to the case 12 by fastening with bolts. The case 12 is fixed to a bottom face of the concave portion 121.

The case 12 can house other devices in addition to the assembled battery 11. Examples of the other devices include a system main relay, a battery monitoring unit, a current sensor, and a current breaker. The system main relay is switched between ON and OFF to connect the assembled battery 11 with the motor generator or to disconnect the assembled battery 11 from the motor generator. The battery monitoring unit can monitor the voltage of the assembled battery 11 or monitors the temperature of the assembled battery 11 based on the output from a temperature sensor. The current sensor detects the values of current when the assembled battery 11 is charged and discharged. The current breaker includes a plug and can break the current passing through the assembled battery 11 when the plug is withdrawn.

Figure 2:
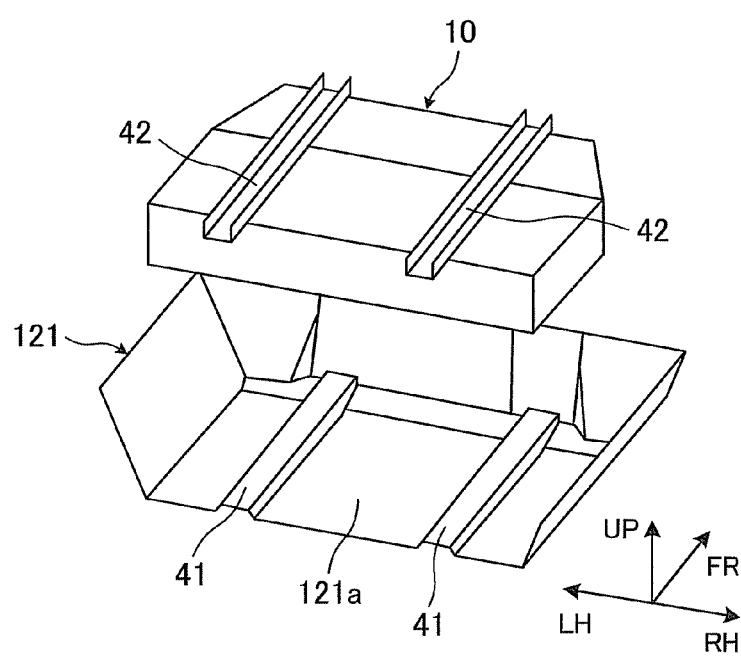
FIG. 2 is a perspective view of a mounting structure for a battery pack in Embodiment 1.
Figure 3:
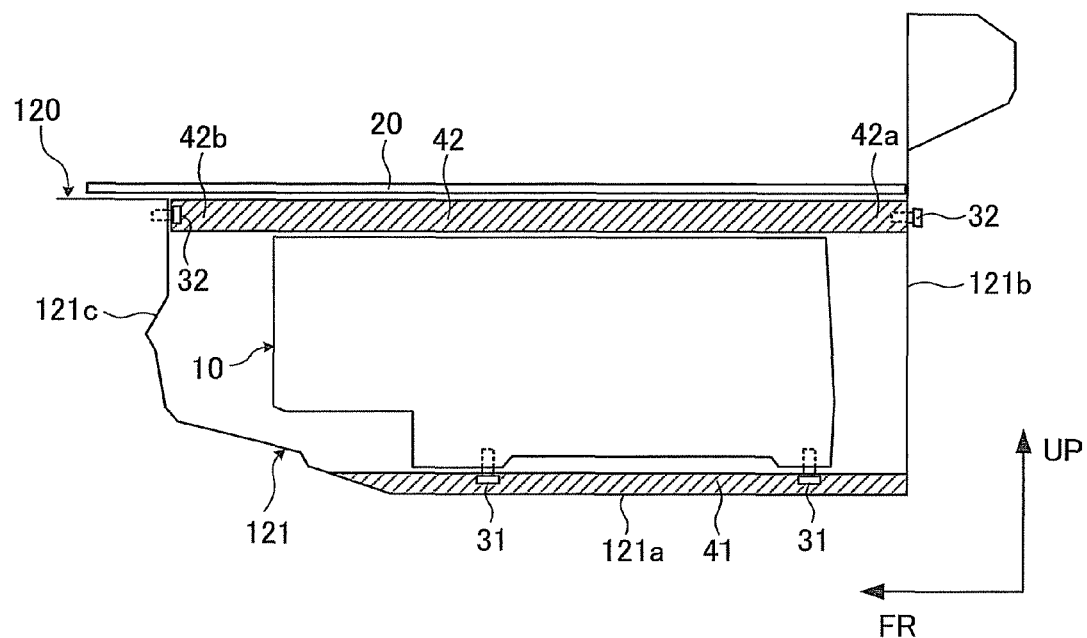
FIG. 3 is a side view of the mounting structure for the battery pack in Embodiment 1.
Figure 4:
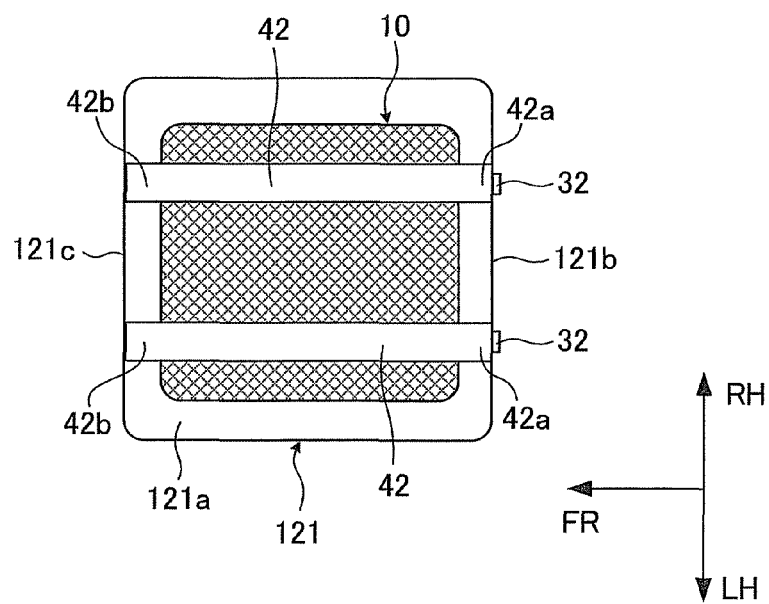
FIG. 4 is a top view of the mounting structure for the battery pack in Embodiment 1.

FIG. 2 is a perspective view of a mounting structure for the battery pack 10. FIG. 3 is a side view of the mounting structure for the battery pack 10. FIG. 4 is a top view of the mounting structure for the battery pack 10. In FIG. 2 and FIG. 4, an arrow RH indicates a right direction when the vehicle faces forward, and an arrow LH indicates a left direction when the vehicle faces forward.

Two first reinforces 41 are disposed on a bottom face 121a of the concave portion 121. The first reinforce 41 is fixed to the bottom face 121a of the concave portion 121. The first reinforce 41 is only required to be fixed to the bottom face 121a of the concave portion 121. The fixing of the first reinforce 41 to the concave portion 121 (bottom face 121*a*) is performed, for example by welding or fastening with bolts.

The first reinforce 41 extends in a front-rear direction of the vehicle 100 (the direction of the arrow FR), and the two first reinforces 41 are placed side by side in a left-right direction of the vehicle 100 (the directions of the arrow RH and the arrow LH). The first reinforce 41 has an open section structure in a plane orthogonal to the front-rear direction of the vehicle 100. The length of the first reinforce 41 in the front-rear direction of the vehicle 100 can be set as appropriate. The first reinforce 41 is preferably provided from one end to the other end of the bottom face 121*a* in the front-rear direction of the vehicle 100.

Although the first reinforce 41 is formed of a member different from that of the concave portion 121 (bottom face 121*a*) in the present embodiment, the present invention is not limited thereto. Specifically, the first reinforce 41 and the concave portion 121 can be formed integrally in one piece, and in this case, a portion of the concave portion 121 corresponds to the first reinforce 41.

A bottom face of the battery pack 10 (case 12) is fixed to an upper face of the first reinforce 41. Specifically, as shown in FIG. 3, the bottom face of the battery pack 10 (case 12) is fastened to the first reinforce 41 by using bolts 31 serving as fastening members. The positions to fasten the battery pack 10 to the first reinforces 41 and the number of the fastening points can be set as appropriate.

In the present embodiment, the area of the battery pack 10 located closer to the front of the vehicle 100 and the area located closer to the back of the vehicle 100 are fastened to the concave portion 121 by the bolts 31. The battery pack 10 is fastened at two positions for each of the first reinforces 41.

Such a fastening structure using the bolts 31 may be different from the structure shown in FIG. 3. It is only required that the battery pack 10 should be fastened to the concave portion 121 with the bolts 31. For example, although the bolts 31 are provided for the first reinforces 41 in the present embodiment, the bolts 31 may be provided for the battery pack 10.

Two second reinforces 42 are disposed over the upper face of the battery pack 10. The second reinforce 42 extends in the front-rear direction of the vehicle 100 (the direction of the arrow FR). The two second reinforces 42 are placed side by side in the left-right direction of the vehicle 100 (the directions of the arrow RH and the arrow LH). The positions to place the second reinforces 42 can be set as appropriate. For example, the second reinforces 42 can be placed at the positions opposite to the first reinforces 41 in an up-down direction of the vehicle 100. Alternatively, the second reinforces 42 and the first reinforces 41 may not be opposite to each other in the up-down direction of the vehicle 100.

As shown in FIG. 3, the first reinforce 41 and the second reinforce 42 surround the battery pack 10 together with the concave portion 121. The upper face of the first reinforce 41 is in contact with the bottom face of the battery pack 10. The second reinforce 42 may be in contact with the upper face of the battery pack 10 or may be separate from the upper face of the battery pack 10.

One end 42*a* of the second reinforce 42 is fixed to a side face 121*b* of the concave portion 121. Specifically, the end 42*a* of the second reinforce 42 is fastened to the side face 121*b* of the concave portion 121 by using a bolt 32 serving as a fastening member. The side face 121*b* refers to the side face of the concave portion 121 that is located closer to the back of the vehicle 100 and extends upward from the bottom face 121*a* in the vehicle 100.

Such a structure for fastening the second reinforce 42 to the concave portion 121 using the bolt 32 may be different from the structure shown in FIG. 3. It is only required that the one end 42*a* of the second reinforce 42 should be fastened to the concave portion 121 with the bolt 32.

The other end 42*b* of the second reinforce 42 is fastened to a side face 121*c* of the concave portion 121 by another bolt 32 serving as a fastening member. The side face 121*c* refers to the side face of the concave portion 121 that is located closer to the front of the vehicle 100 and extends upward from the bottom face 121*a* in the vehicle 100. In the present embodiment, the second reinforce 42 is disposed over the upper face of the battery pack 10 within the concave portion 121. The deck board 20 is disposed above the second reinforce 42.

The two side faces 121*b* and 121*c* are opposite to each other in the front-rear direction of the vehicle 100. Such a structure for fastening the second reinforce 42 to the concave portion 121 with the bolt 32 may be different from the structure shown in FIG. 3. It is only required that the other end 42*b* of the second reinforce 42 should be fastened to the concave portion 121 with the bolt 32.

Although the first reinforce 41 and the second reinforce 42 extend in the front-rear direction of the vehicle 100 in the present embodiment, the present invention is not limited thereto. It is only required that the first reinforce 41 and the second reinforce 42 should extend in the same direction. For example, the first reinforce 41 and the second reinforce 42 may be disposed such that the first reinforce 41 and the second reinforce 42 extend in the left-right direction of the vehicle 100 (the directions of the arrow RH and the arrow LH). Alternatively, the first reinforce 41 and the second reinforce 42 may be disposed such that the first reinforce 41 and the second reinforce 42 extend in a direction at an angle with respect to the front-rear direction and the left-right direction of the vehicle 100.

Although the two first reinforces 41 are disposed below the lower face of the battery pack 10 and the two second reinforces 42 are disposed over the upper face of the battery pack 10 in the present embodiment, the present invention is not limited thereto. The number of the first reinforces 41 and the number of the second reinforces 42 can be set as appropriate. The number of the first reinforces 41 and the number of the second reinforces 42 may be the same or different from each other.

Although the second reinforce 42 is not fixed to the upper face of the battery pack 10 in the present embodiment, the second reinforce 42 may be fixed to the upper face of the battery pack 10. For example, the second reinforce 42 can be welded to the upper face of the battery pack 10 or the second reinforce 42 can be fastened to the upper face of the battery pack 10 by using bolts. The positions to fix the second reinforces 42 to the battery pack 10 and the number of the fixing points can be set as appropriate.

According to the present embodiment, the first reinforce 41 and the second reinforce 42 can be used to increase the strength of the concave portion 121. The concave portion 121 is disposed in a rearward portion of the vehicle 100 and may be deformed when a shock is given to the vehicle 100 from the back. However, the first reinforce 41 and the second reinforce 42 can suppress such deformation of the concave portion 121 when a shock is given to the concave portion 121 from the back of the vehicle 100.

Since the first reinforce 41 and the second reinforce 42 are disposed within the concave portion 121 and extend in the front-rear direction of the vehicle 100, they can prevent the side faces 121*b* and 121*c* of the concave portion 121 from being deformed toward the inside of the concave portion 121. When a shock is given to the concave portion 121 from the back of the vehicle 100, the first reinforce 41 and the second reinforce 42 can suppress the deformation of the side face 121b toward the inside of the concave portion 121.

The suppression of the deformation of the concave portion 121 can protect the battery pack 10 housed in the concave portion 121. In addition, since the first reinforce 41 is fixed to the bottom face of the battery pack 10, the strength of the battery pack 10 can be ensured. In other words, the first reinforce 41 can suppress the deformation of the battery pack 10.

In the present embodiment, the concave portion 121 is disposed in the rearward portion of the vehicle 100, and when the vehicle 100 collides at the back, an external force toward the front of the vehicle 100 is likely to act on the concave portion 121. To address this, the first reinforce 41 and the second reinforce 42 extending in the front-rear direction of the vehicle 100 can be used to cause the external force toward the front of the vehicle 100 to be received by the first reinforce 41 and the second reinforce 42, thereby facilitating the suppression of the deformation of the concave portion 121.

Figure 5:
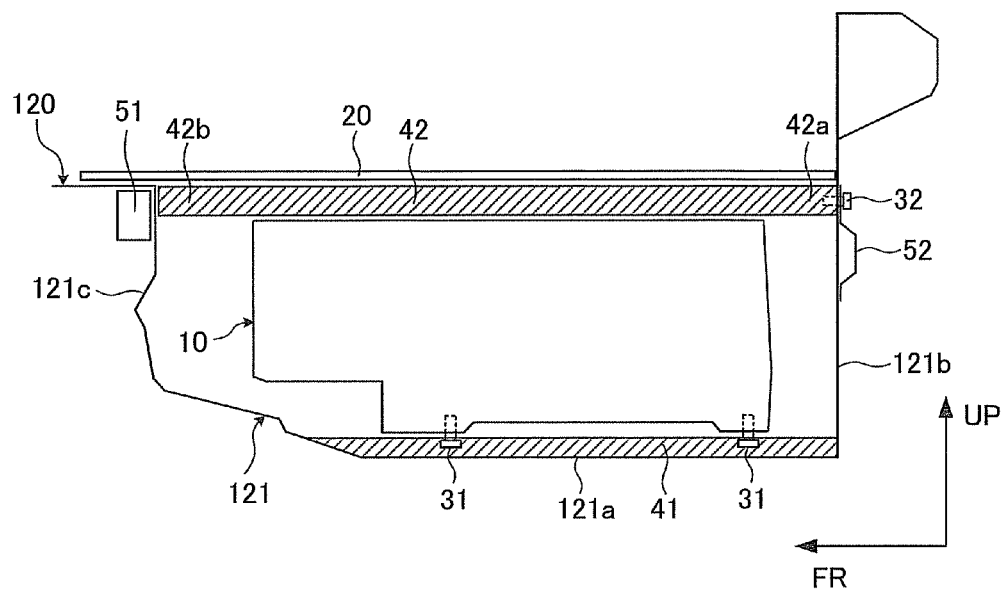
FIG. 5 is a side view of a mounting structure for a battery pack in a modification of Embodiment 1.

As shown in FIG. 5, a cross-member 51 can be disposed at the position adjacent to the end 42b of the second reinforce 42. FIG. 5 is a side view showing a mounting structure which is a modification of the present embodiment, and corresponds to FIG. 3.

The cross-member 51 can be placed to direct an external force acting on the second reinforce 42 to the cross-member 51. The cross-member 51 is part of the vehicle body and extends in the left-right direction of the vehicle 100. The cross-member 51 can be formed integrally with the floor panel 120 or can be provided independently of the floor panel 120.

When a shock is given to the vehicle 100 at the back, the shock can be directed to the cross-member 51 through the second reinforce 42. This can prevent the application of an excessive load to the second reinforce 42 to suppress the deformation of the second reinforce 42.

As shown in FIG. 5, a cross-member 52 can be disposed at the position adjacent to the end 42a of the second reinforce 42. Specifically, the cross-member 52 can be disposed such that part of the cross-member 52 is adjacent to the end 42a of the second reinforce 42 in the front-rear direction of the vehicle 100. The cross-member 52 extends in the left-right direction of the vehicle 100. The use of the cross-member 52 can increase the strength of the concave portion 121 and transfer the external force acting on the cross-member 52 to the second reinforce 42.

The orientation of the first reinforce 41 and the second reinforce 42, that is, the longitudinal direction of the first reinforce 41 and the second reinforce 42, may be determined depending on the position where the concave portion 121 is disposed. For example, when an external force acting in the left-right direction of the vehicle 100 is likely to act on the concave portion 121, the first reinforce 41 and the second reinforce 42 extending in the left-right direction of the vehicle 100 may be used.

Embodiment 2

Description is now made of a mounting structure for a battery pack which is Embodiment 2 of the present invention. In the present embodiment, in addition to the mounting structure described in Embodiment 1, a structure for positioning a battery pack 10 to a concave portion 121 is provided. The components identical to those described in Embodiment 1 are designated with the same reference numerals, and detailed description thereof is omitted. The following description is mainly focused on differences from Embodiment 1.

Figure 6:
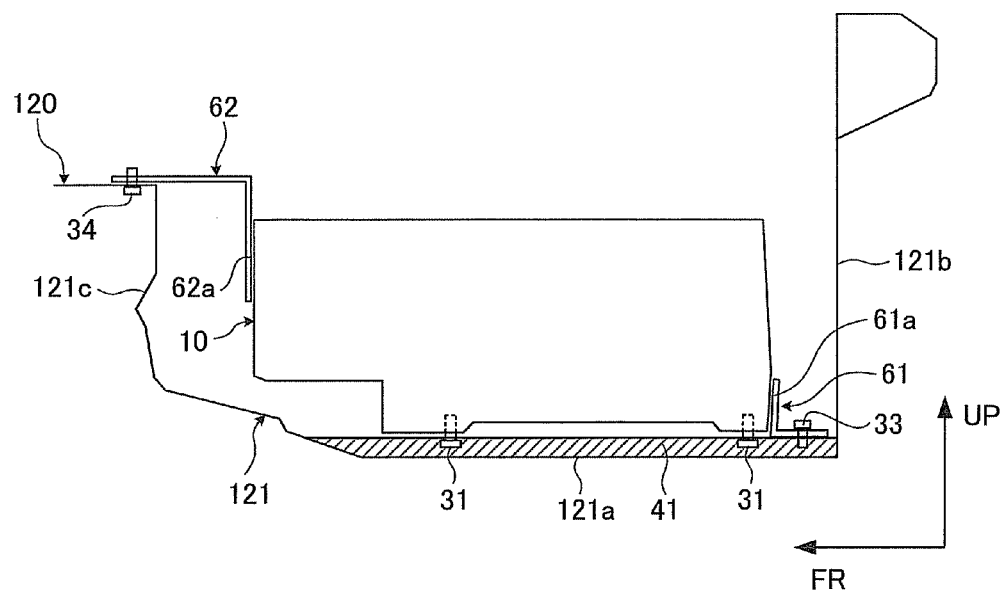
FIG. 6 is a side view of a mounting structure for a battery pack in Embodiment 2.
Figure 7:
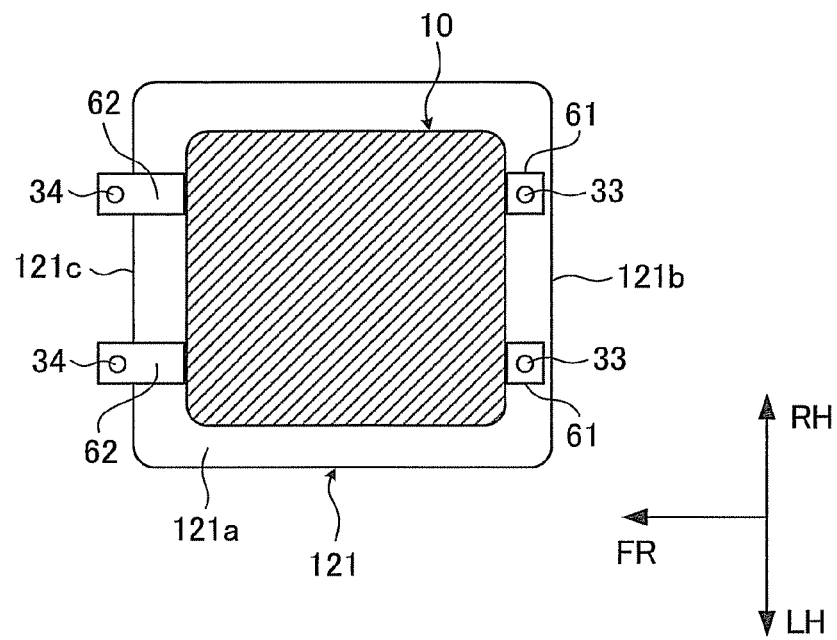
FIG. 7 is a top view of the mounting structure for the battery pack in Embodiment 2.

FIG. 6 is a side view of a mounting structure for the battery pack in the present embodiment, and corresponds to FIG. 3. FIG. 7 is a top view of the mounting structure for the battery pack in the present embodiment, and corresponds to FIG. 4. Although the second reinforces 42 described in Embodiment 1 are omitted in FIG. 6 and FIG. 7, the second reinforces 42 are used similarly in the present embodiment.

First guide members 61 are fixed to first reinforces 41 by using bolts 33 serving as fastening members. The two first reinforces 41 are provided on a bottom face 121a of the concave portion 121, and the first guide member 61 is fixed to each of the first reinforces 41.

The first guide member 61 is disposed on the side of the battery pack 10 closer to the back of a vehicle 100. The first guide member 61 has a guide face 61a extending upward in the vehicle 100. A side face of the battery pack 10 is brought into contact with the guide face 61a to allow the positioning of the battery pack 10 in the concave portion 121. Specifically, the battery pack 10 can be positioned in the front-rear direction of the vehicle 100.

Two second guide members 62 are disposed in an upper portion of the concave portion 121. The second guide members 62 are fixed to an area of a floor panel 120 that is different from the concave portion 121 by using bolts 34 serving as fastening members. The second guide member 62 has a guide face 62a extending downward in the vehicle 100. The guide face 62a is located within the concave portion 121. The second guide member 62 is disposed on the side of the battery pack 10 closer to the front of the vehicle 100.

The guide face 62a is brought into contact with a side face of the battery pack 10 to position the battery pack 10 in the concave portion 121. Specifically, the battery pack 10 can be positioned in the front-rear direction of the vehicle 100. In the present embodiment, the first guide member 61 and the second guide member 62 can be used to position the battery pack 10 in the front-rear direction of the vehicle 100. Specifically, the first guide member 61 and the second guide member 62 hold the battery pack 10 between them in the front-rear direction of the vehicle 100 to suppress the displacement of the battery pack 10 in the front-rear direction of the vehicle 100.

The battery pack 10 is fastened to the first reinforce 41 by using bolts 31. Thus, opening portions for inserting the bolts 31 are formed in the battery pack 10 (case 12) and the first reinforce 41. For fixing the battery pack 10 to the first reinforce 41, the opening portions in the battery pack 10 need to be aligned with the opening portions in the first reinforce 41.

In the present embodiment, the first guide member 61 and the second guide member 62 can be used to position the battery pack 10 in the front-rear direction of the vehicle 100. This can place the battery pack 10 at the position where the bolts 31 can be tightened, so that the fastening with the bolts 31 can be easily performed.

In housing the battery pack 10 into the concave portion 121, an operator has difficulty in seeing the position to mount the battery pack 10 since the operator's view is obstructed by the battery pack 10. To address this, the battery pack 10 can be moved along the first guide members 61 (guide faces 61a) and the second guide members 62 (guide faces 62a) as in the present embodiment to move the battery pack 10 to a predetermined mounting position. The predetermined mounting position refers to the position where the battery pack 10 can be fastened to the first reinforce 41 by the bolts 31.

Although the first guide member 61 and the second guide member 62 are used to position the battery pack 10 in the present embodiment, the present invention is not limited thereto. Only one of the first guide member 61 and the second guide member 62 may be used to position the battery pack 10.

Although the two first guide members 61 and the two second guide members 62 are used in the present embodiment, the present invention is not limited thereto. The number of the first guide members 61 and the number of the second guide members 62 can be set as appropriate. The number of the first guide members 61 and the number of the second guide members 62 may be the same or different from each other. The positions to place the first guide members 61 and the second guide members 62 may be determined in view of the position where the battery pack 10 is mounted.

Although the first guide member 61 and the second guide member 62 are disposed on both sides of the battery pack 10 in the front-rear direction of the vehicle 100 in the present embodiment, the present invention is not limited thereto. Specifically, the guide members can be disposed on both sides of the battery pack 10 in the left-right direction of the vehicle 100. In this case, the battery pack 10 can be positioned in the left-right direction of the vehicle 100.

Although the first guide member 61 is disposed on the bottom face 121a of the concave portion 121 in the present embodiment, the first guide member 61 may be disposed in an upper portion of the concave portion 121. Although the second guide member 62 is disposed in the upper portion of the concave portion 121, the second guide member 62 may be disposed on the bottom face 121a of the concave portion 121. The positions of the first guide member 61 and the second guide member 62 in the up-down direction of the vehicle 100 can be set as appropriate.

Embodiment 3

Figure 8:
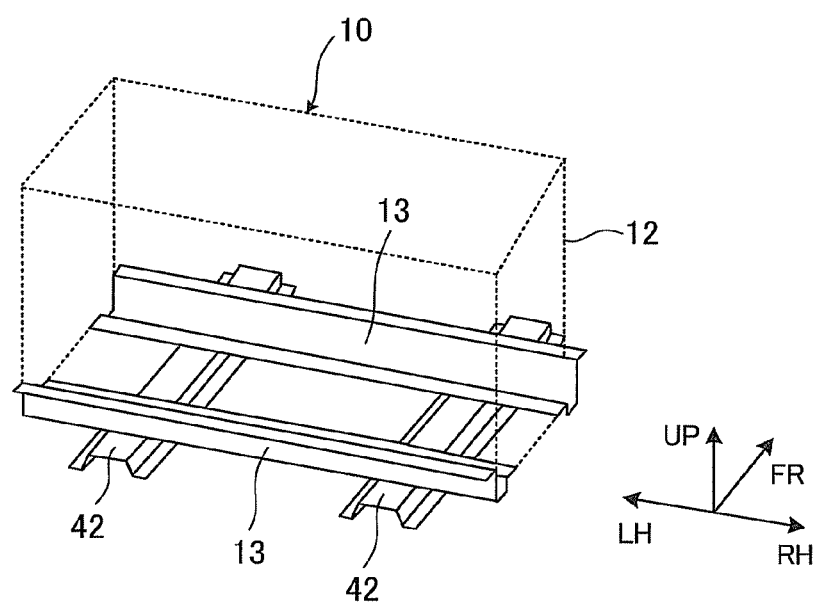
FIG. 8 is a diagram showing the positional relationship between a reinforce for a battery pack and a reinforce provided for a floor panel in Embodiment 3.

Description is now made of a mounting structure for a battery pack which is Embodiment 3 of the present invention. FIG. 8 shows the positional relationship between the structure of part of a battery pack 10 and a first reinforce 41. In the present embodiment, the components identical to those described in Embodiments 1 and 2 are designated with the same reference numerals, and detailed description thereof is omitted. The following description is mainly focused on differences from Embodiments 1 and 2.

Two reinforces (corresponding to third reinforces) 13 are provided for the battery pack 10 (case 12). Each of the reinforces 13 extends in the left-right direction of a vehicle 100, and the two reinforces 13 are placed side by side in the front-rear direction of the vehicle 100.

Figure 9:
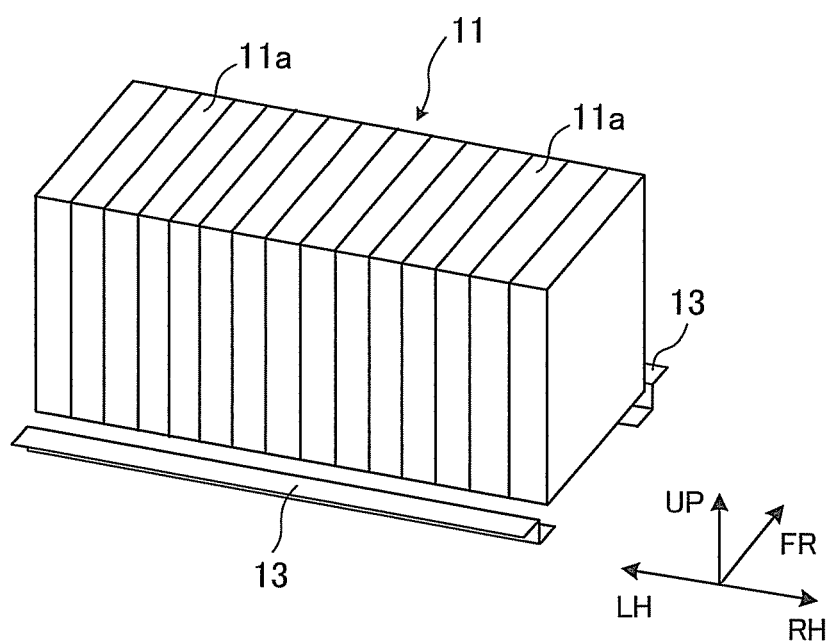
FIG. 9 is an external view of an assembled battery in Embodiment 3.

As shown in FIG. 9, an assembled battery 11 housed in the case 12 has a plurality of cells (corresponding to electric storage elements) 11a. The plurality of cells 11a are disposed along the direction in which the reinforce 13 extends (in other words, the left-right direction of the vehicle 100). A so-called square-type cell is used as the cell 11a. The two reinforces 13 are disposed along bottom faces of the cells 11a. Instead of the cell 11a, a battery module (corresponding to the electric storage element) may be used. The battery module is formed of a plurality of cells connected electrically in series. A plurality of such battery modules can be placed in the direction in which the reinforce 13 extends.

The two reinforces 13 and the two first reinforces 41 are fastened to each other by using bolts serving as fastening members. Each of the reinforces 13 intersects the two reinforces 41, and the intersection serves as the fastening point.

According to the present embodiment, the reinforces 13 for the battery pack 10 can be fastened to the first reinforces 41 to increase the strength of the battery pack 10. Since the reinforce 13 extends in the left-right direction of the vehicle 100, the strength of the battery pack 10 can be increased in the left-right direction of the vehicle 100. Since the first reinforce 41 extends in the front-rear direction of the vehicle 100, the strength of the battery pack 10 can be increased in the front-rear direction of the vehicle 100.

Although the reinforce 13 for the battery pack 10 extends in the left-right direction of the vehicle 100 and the first reinforce 41 extends in the front-rear direction of the vehicle 100 in the present embodiment, the present invention is not limited thereto. For example, the reinforce 13 may extend in the front-rear direction of the vehicle 100 and the first reinforce 41 may extend in the left-right direction of the vehicle 100. It is only required that the reinforces 13 and 41 should intersect in a plane including the front-rear direction and the left-right direction of the vehicle 100.

Although the reinforce 13 is disposed on the bottom face of the battery pack 10 in the present embodiment, the present invention is not limited thereto. Specifically, in addition to or instead of the configuration of the present embodiment, a reinforce may be disposed on an upper face of the battery pack 10. The reinforce disposed on the upper face of the battery pack 10 extends in the left-right direction of the vehicle 100 similarly to the reinforce 13. The reinforce disposed on the upper face of the battery pack 10 can be fastened to a second reinforce 42 by using bolts. This can increase the strength of the battery pack 10 at the upper face.

The invention claimed is:

1. A mounting structure for an electric storage apparatus comprising:
    the electric storage apparatus outputting an energy for use in running of a vehicle;
    a floor panel including a concave portion as a part of the floor panel, the concave portion housing the electric storage apparatus and opened upward in the vehicle;
    a first reinforcement disposed along a bottom face of the concave portion and extending in a front-rear direction of the vehicle; and
    a second reinforcement disposed along an upper face of the electric storage apparatus and extending in the front-rear direction of the vehicle,
    wherein the concave portion is defined by a first inside face, a second inside face opposite to the first inside face in the front-rear direction of the vehicle, and the bottom face,
    wherein the first inside face and the second inside face are integrally formed with the bottom face, respectively and
    wherein the second reinforcement is disposed within the concave portion, one end of the second reinforcement is directly fixed to the first inside face of the concave portion and the other end of the second reinforcement is directly fixed to the second inside face of the concave portion.

2. The mounting structure for the electric storage apparatus according to claim 1, wherein the first reinforcement is formed integrally with the concave portion.

3. The mounting structure for the electric storage apparatus according to claim 1, wherein an end portion of the second reinforcement on the front side of the vehicle is disposed at a position adjacent to a cross-member that is arranged on the front side of the vehicle with respect to the concave portion, the cross-member being a portion of a vehicle body and extending in a left-right direction of the vehicle.

4. The mounting structure for the electric storage apparatus according to claim 1, further comprising:
   a fastening member fastening the electric storage apparatus to the bottom face of the concave portion; and
   a guide member guiding the electric storage apparatus to a mounting position in the concave portion.

5. The mounting structure for the electric storage apparatus according to claim 4, wherein the guide member is disposed at each of positions between which the electric storage apparatus is sandwiched in the front-rear direction of the vehicle.

6. The mounting structure for the electric storage apparatus according to claim 5, wherein the guide member includes:
   a first guide member disposed along the bottom face of the concave portion; and
   a second guide member disposed along an upper portion of the concave portion.

7. The mounting structure for the electric storage apparatus according to claim 4, wherein the guide member includes:
   a first guide member disposed along the bottom face of the concave portion; and
   a second guide member disposed along an upper portion of the concave portion.

8. The mounting structure for the electric storage apparatus according to claim 1, wherein the electric storage apparatus has a third reinforcement disposed along the upper face or a lower face of the electric storage apparatus, and
   the third reinforcement extends in a direction intersecting the first reinforcement or the second reinforcement and is fixed to the first reinforcement or the second reinforcement at the intersection.

9. The mounting structure for the electric storage apparatus according to claim 8, wherein the electric storage apparatus has a plurality of electric storage elements disposed side by side in the direction in which the third reinforcement extends.

10. The mounting structure for the electric storage apparatus according to claim 1, wherein the concave portion is located below a luggage space of the vehicle.

* * * * *